(12) United States Patent
Dew et al.

(10) Patent No.: US 7,356,652 B1
(45) Date of Patent: Apr. 8, 2008

(54) SYSTEM AND METHOD FOR SELECTIVELY STORING BUS INFORMATION ASSOCIATED WITH MEMORY COHERENCY OPERATIONS

(75) Inventors: Marshall R. Dew, Plymouth, MN (US); Stephen Sutter, Osseo, MN (US); Howard Huy P. Tran, Woodbury, MN (US); David P. Williams, Mounds View, MN (US)

(73) Assignee: Unisys Corporation, Blue Bell, PA (US)

( * ) Notice: Subject to any disclaimer, the term of this patent is extended or adjusted under 35 U.S.C. 154(b) by 205 days.

(21) Appl. No.: 11/390,680

(22) Filed: Mar. 28, 2006

(51) Int. Cl.
*G06F 12/00* (2006.01)
(52) U.S. Cl. ...................... 711/146; 711/141
(58) Field of Classification Search ............... 711/146
See application file for complete search history.

(56) References Cited

U.S. PATENT DOCUMENTS 6,049,847 A * 4/2000 Vogt et al. ............... 710/309
6,697,900 B1 * 2/2004 Hadley .................. 710/109
6,792,563 B1 * 9/2004 DesRosier et al. ........... 714/43

\* cited by examiner

*Primary Examiner*—Donald Sparks
*Assistant Examiner*—Aracelis Ruiz
(74) *Attorney, Agent, or Firm*—Charles A. Johnson; Robert Marley; Hollingsworth & Funk LLC

(57) ABSTRACT

A manner for judiciously snooping or otherwise monitoring bus operations associated with maintaining cache or other memory coherency in a computing system. A bus snoop information storage mode is established that identifies information pertaining to the bus snoop operations used to maintain memory coherency. The bus snoop information storage mode is selectable, relative to possible other modes. When the bus snoop information storage mode is activated, the information pertaining to the bus snoop operations occurring in connection with bus snoop stall cycles is disregarded, while the current state of the information pertaining to the bus snoop operations upon completion of the bus snoop operations is stored.

17 Claims, 10 Drawing Sheets

SYSTEM AND METHOD FOR SELECTIVELY STORING BUS INFORMATION ASSOCIATED WITH MEMORY COHERENCY OPERATIONS

CROSS REFERENCE TO CO-PENDING APPLICATIONS

U.S. patent application Ser. No. 09/475,563, filed Dec. 30, 1999, and entitled, "Method for Controlling and Collecting Information in a Data Processing System" and U.S. patent application Ser. No. 10/330,829, filed Dec. 27, 2002, and entitled, "Method and Apparatus for a Maskable History Stack" are commonly assigned co-pending applications.

FIELD OF THE INVENTION

This invention relates in general to computing system monitoring, and more particularly to systems, apparatuses and methods for judiciously snooping or otherwise monitoring bus operations associated with maintaining cache or other memory coherency in a computing system.

BACKGROUND OF THE INVENTION

As computer architectures continue to increase in processing power, the associated processing "real estate" continues to get smaller. While this is clearly beneficial, it creates new issues in the design, and particularly the testing, of these systems. In the earlier days of computing, designs were typically tested by manually probing access points in the system, which facilitated design verification and error discovery. The advent of semiconductor chips introduced smaller, more efficient systems, but testing still typically involved manual detection of problems. As software became more effective and popular, software compiling and debugging tools allowed computer programs to be more easily tested, yet hardware was still tested by analyzing signals at hardware access points. Test systems often included the use of dedicated connectors on printed circuit boards (PCBs), "bed-of-nails" test facilities, and the like. These systems, while useful in their day, are of diminishing value in the modern computer era, where in some cases computing systems can reside on a single chip. Even large-scale computers, while increasing in computational power, have been greatly reduced in size through the use of programmable logic devices, application-specific integrated circuits (ASICs), etc. Thus, while aggregating computational power into a small number of chips is highly beneficial to increase computer performance and marketability, it has made collecting information for purposes of testing, debugging and servicing increasingly challenging.

As integrated circuits continue to operate at faster speeds and have greater cell densities, it becomes more difficult to detect errors and capture information that assists in locating and identifying the errors. For example, as ASICs continue to become more densely populated, an increasing amount of the ASIC circuitry is embedded and unavailable for direct monitoring. Information from within the ASIC must somehow be captured and provided externally for analysis.

The information collected may be used for debugging problems found during the simulation and hardware checkout phases. Initial errors occurring during the design phase can be corrected with the help of an effective debugging mechanism. The information may also be used for analyzing problems reported from customer sites, as it is imperative that error discovery and analysis be provided in order to service customers without having to replace an entire system. The performance of the particular computer system under analysis can also be gauged by collecting and monitoring information generated by an operational computer system.

These issues are exacerbated in the context of multi-processor systems, and particularly those that employ cache or other memory that is shared between these processors or other agents coupled to the system bus. More particularly, some computing systems require that each processor or agent have access to the same physical memory, generally through the same system bus. When all processors share a single image of the memory space, that memory is said to be coherent, where data retrieved by each processor from the same memory address will be the same data. Coherence becomes more difficult through the use of high speed cache or other similar memory. For example, when a processor reads data from a system memory location, it may store that data in a cache memory. A successive read operation from the same system memory address results instead, in a read from the cache, in order to provide an improvement in access speed. Likewise, write operations to the same system memory address may result in a write operation to the cache, which can lead to data incoherence if not properly managed. As each processor maintains its own copy of system level memory within its cache, subsequent data writes cause the memory in each cache to diverge.

Cache coherency protocols ensure that one processor's cached copy of a shared memory location is invalidated when another processor writes to that location. Thus, each processor in a multi-processor system is typically responsible for snooping the system bus to maintain currency of its own cache. Coherent memory requests may communicate the memory accessed by one processor to the other processors on the bus through the use of bus "snooping" functions, so that stale data is not used. For example, when a cache update is performed on shared cache data, it can be announced over or otherwise ascertainable via the bus. Each processor monitors or "snoops" the bus to perceive this information, and reacts accordingly. If a particular processor has a copy of the cache line that is being requested by another processor or agent, it may have to surrender its exclusive copy of the data, change the state of its shared copy, etc.

During a bus snoop phase, the various processors snoop the bus and provide snoop results that correspond to the address associated with the request. These snoop results may provide status of the cache line(s) associated with the respective processor, and indicate whether the transaction has completed. For example, if a processor cannot determine the status of its associated cache or is otherwise unable to determine whether a transaction will be completed, valid snoop results for that processor will not be provided. In these cases, the snoop results may be delayed until a later time, in terms of clock cycles. These delays may occur many times until valid snoop results are provided.

It is important to be able to debug, troubleshoot or otherwise analyze the system using the snoop results. However, because information is available on the bus during the potentially many snoop delays, the snoop data is difficult to analyze as it is riddled with data associated with such snoop delays. Further, such irrelevant data could flood a memory device with irrelevant information, to the exclusion of needed data, thereby requiring larger memories or risking loss of relevant data.

Accordingly, there is a need for an effective debugging and analyzing system and method that will allow for the selective capture and recording of only relevant information relating to cache or other memory coherency operations. The present invention fulfills these and other needs, and offers other advantages over prior art approaches.

SUMMARY OF THE INVENTION

To overcome limitations in the prior art described above, and to overcome other limitations that will become apparent upon reading and understanding the present specification, the present invention discloses a system, apparatus and method for selectively storing bus information associated with cache or other memory coherency operations. Embodiments of the invention allow data, arising in connection with bus monitoring or "snoop" operations, to be selectively captured such that only relevant portions of that data are actually stored for use in historical data analysis or otherwise.

In accordance with one embodiment of the invention, a bus snoop information storage mode is established that identifies information pertaining to the bus snoop operations used to maintain memory coherency. The bus snoop information storage mode is selectable; i.e., the particular mode can be controlled. When the bus snoop information storage mode is activated, the information pertaining to the bus snoop operations occurring in connection with bus snoop stall cycles is disregarded, while the current state of the information pertaining to the bus snoop operations upon completion of the bus snoop operations is stored.

In more particular embodiments, the method further includes determining the completion of the bus snoop operations by monitoring for memory hit and miss indicators for each of the agent having an associated memory for which the memory coherency is to be maintained. Completion of the bus snoop operations is recognized when each of the agents have respectively indicated a memory hit or miss. In another embodiment, the bus snoop stall cycles are recognized by determining whether any of the agents have not yet indicated a memory hit or miss. The recognition of bus snoop stall cycles may repeat until all of the agents have indicated a memory hit or miss, at which time the bus snoop operations have completed.

In other particular embodiments, the method includes designating multiple information storage modes, each identifying a different set of information of the computing system to be monitored, where at least one of the information storage modes is the bus snoop information storage mode. Establishing a bus snoop information storage mode thus involves designating an information storage mode(s) as the bus snoop information storage mode.

In other particular embodiments of the method, recording a current state of the information involves storing the current state of the information pertaining to the bus snoop operations when the bus snoop operations have completed without any of the bus snoop stall cycles. One embodiment involves recording the information as an entry in a multi-entry memory device, and incrementing the memory to the next available entry location upon recording the current state of the information. In another embodiment, disregarding the information pertaining to the bus snoop operations occurring in connection with bus snoop stall cycles involves monitoring both the information pertaining to the bus snoop operations occurring in connection with bus snoop stall cycles and the information pertaining to the bus snoop operations upon completion of the bus snoop operations. In such case, only the information pertaining to the bus snoop operations is stored upon completion of the bus snoop operations. In yet another embodiment, disregarding the information pertaining to the bus snoop operations occurring in connection with bus snoop stall cycles involves monitoring only the information pertaining to the bus snoop operations upon completion of the bus snoop operations, and recording the current state of the information.

According to another embodiment of the invention, an apparatus is provided for selectively storing information associated with bus snoop operations used to maintain cache coherency in a computing system. The computing system includes multiple agents (e.g., processors) each associated with at least one respective cache memory for which the cache coherency is to be maintained. The apparatus includes a memory, and a history control register to receive and store data indicative of a bus snoop information storage mode. The apparatus also includes a history control processing arrangement coupled to the history control register and to the memory, and includes an interface to receive the information associated with the bus snoop operations. The history control processing arrangement is configured to activate the bus snoop information storage mode based on the data in the history control register, and in response, to prohibit the memory from storing a first subset of the information corresponding to bus snoop operation data occurring in connection with bus snoop stall cycles. The history control processing arrangement is further configured to enable the memory to store a second subset of the information corresponding to bus snoop operation data occurring in connection with completed bus snoop operations.

In more particular embodiments, the apparatus includes a user input device that can communicate with the history control register to facilitate user entry of the data indicative of the bus snoop information storage mode. In one embodiment, the history control register is implemented as a dynamic scan register to serially receive the data indicative of the bus snoop information storage mode. In yet another embodiment, a computing device is coupled to the history control register to allow a user to retrieve the second subset of the information from the memory.

According to another embodiment of the invention, a system is provided for selectively storing information associated with bus snoop operations used to maintain cache coherency in a multi-agent computing system. The system includes a module to receive indicators that each identify a respective information storage mode. A module is provided to activate a bus snoop information storage mode in response to identification of a particular one of the storage modes. A module is provided for prohibiting storage of a first set of the information associated with the bus snoop operations that occurs in connection with bus snoop stall cycles affecting any of the agents in the multi-agent computing system, when the bus snoop information storage mode has been activated. A module is also provided to enable storage of a second set of the information associated with the bus snoop operations that occurs in connection with completion of the bus snoop operations when all of the bus snoop stall cycles have ceased, when the bus snoop information storage mode has been activated. A storage module is provided to store the second set of the information.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

BRIEF DESCRIPFTION OF THE DRAWINGS

The invention is described in connection with the embodiments illustrated in the following diagrams.

DETAILED DESCRIPTION

Figure 1:
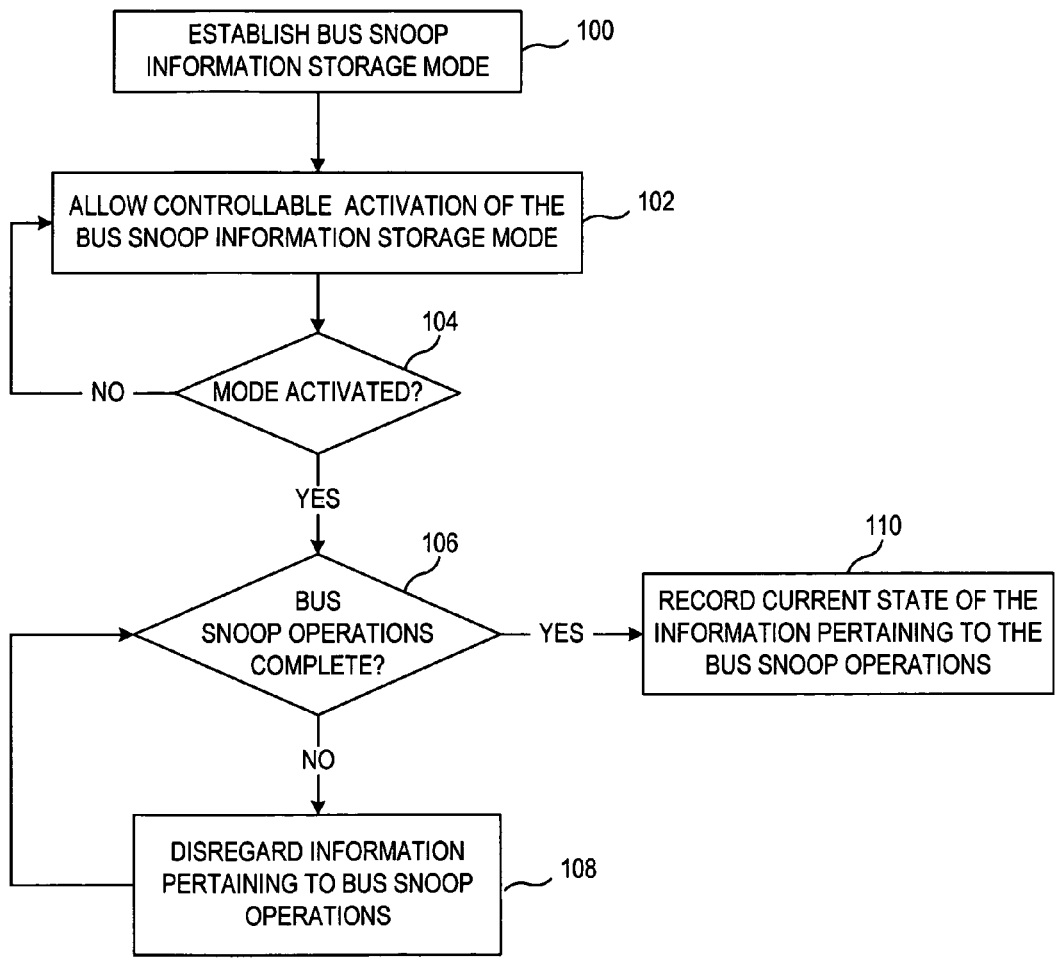
FIG. 1 is a diagram illustrating a representative method for storing pertinent information associated with bus snoop operations according to an embodiment of the invention.

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention is directed to systems, apparatuses and methods for judiciously recording bus "snooping" or analogous bus monitoring activities associated with maintaining cache coherency in a computing system. Embodiments of the invention enable pertinent bus operation information to be selectively stored, to the exclusion of irrelevant or otherwise unproductive bus operation information.

An example of such unproductive bus operation information is the information pertaining to bus snoop operations that occurs during periods when the snoop phase has stalled due to at least some snoop results being unavailable. According to embodiments of the invention a particular mode(s) may be established that identifies this information pertaining to the bus snoop operations. When this mode is activated, information associated with the bus snoop operations occurring in connection with the stalled snoop phase are disregarded; however, the relevant information is stored upon completion of the bus snoop operations. This allows the pertinent history of snoop activity to be recorded without introducing irrelevant snoop-related data into the stored history data. Among other things, this facilitates efficient analysis of the snoop history data, minimizes analysis errors, and allows for more manageable sizes of snoop history storage devices/media.

The present invention is particularly beneficial in the context of bus snoop operations associated with maintaining cache coherency in computing or other processing systems involving shared memory. Shared memory is often used in a parallel or multiprocessing system, and can be accessed by more than one processor or other agent. The shared memory is connected to the multiple processors or agents, which is typically accomplished using a shared bus or network. Shared memories may be designed to cooperate with local cache memories associated with each processor/agent in the system. The terms "agent and "processor" are used interchangeably herein for purposes of requesting devices, but it should be recognized that an "agent" is not limited to a processor, as other components may serve as the requesting module.

Cache coherency protocols ensure that one agent's cached copy of a shared memory location is invalidated when another agent writes to that location. Thus, each agent in a multi-agent system is typically responsible for snooping the common bus to maintain currency of its own cache or other memory data. Using any of a number of known techniques, coherent memory requests communicate the memory accessed by one processor to the other processors on the bus through the use of such a bus snooping function, so that stale data is not used. For example, when a cache update is performed on shared cache data, it can be announced over or otherwise ascertainable via the bus. Each agent monitors or "snoops" the bus to perceive this information, and reacts accordingly. As a more particular example, during the snoop of a memory read function, each of the agents on the bus may check to see if it has a copy of the cache line(s) that is being requested. If the agent has a copy of the requested cache line(s) that another agent is seeking, it may have to surrender its exclusive copy of the data, change the state of its shared copy, etc.

A snoop phase typically follows a request phase, where an agent requests that data is to be written or otherwise accessed. During this phase, the various agents snoop the bus and provide snoop results that correspond to the address associated with the request phase. These snoop results may provide status of the cache line(s) associated with the respective agent, and indicate whether the transaction has completed. For example, if an agent cannot determine the status of its associated cache or is otherwise unable to determine whether a transaction will be completed, valid snoop results for that agent(s) will not be provided. In these cases, the snoop results may be delayed until a later time, in terms of clock cycles. These delays, referred to herein as bus snoop stalls or bus snoop stall cycles, may occur many times until valid snoop results are provided.

It is important to be able to debug, troubleshoot or otherwise analyze the system using the snoop results. The present invention allows such snoop history data to be stored, but only the pertinent data is stored. More particularly, bus data occurring or otherwise available during times of bus snoop stalls is typically irrelevant, as it does not correspond to actual data present at the time that the valid snoop results are provided. Thus, in accordance with embodiments of the invention, a capture mode is provided that, when activated, enables recording of snoop history data only when a snoop of the system bus is complete.

FIG. 1 is a diagram illustrating one embodiment of the invention, involving a method for recording pertinent information associated with bus snoop operations used to maintain memory coherency in a computing system. The computing system may be any type of computing system that implements bus snooping operations. One representative computing system in which the principles of the present invention are applicable is described in connection with FIGS. 4-10, although as indicated above, any computing system implementing snoop operations can benefit from the present invention.

As shown in FIG. 1, a bus snoop information storage mode is established 100. This mode may include functions exclusive to the bus snoop storage functions of the present invention, or alternatively may also include functions associated with other functions. Thus, the bus snoop information storage mode may operate independently, or in connection with other desired functions of the computing system. In one embodiment, multiple modes for gathering "history" information of the computing system are provided, where at least one of those modes is a bus snoop information storage mode in accordance with the invention. In any case, the embodiment of FIG. 1 involves a bus snoop information storage mode(s) that identifies information pertaining to the bus snoop operations used to maintain memory coherency, for example cache coherency, in the computing system. The embodiment of FIG. 1 includes facilitating controllable activation of at least the bus snoop information storage mode, as shown at block 102. For example, the system may allow for manual user-initiated activation of the bus snoop information storage mode. In another embodiment, the mode may be activated automatically upon recognition of a triggering event, such as the occurrence of a system event, during a particular maintenance period, a particular time, or any other triggerable incident. The activation may also involve any combination of user-initiated and automatic events.

When the bus snoop information storage mode is activated as determined at decision block 104, it is determined 106 if the current bus snoop operations have completed. In this regard, and in one embodiment of the invention, the completion of bus snoop operations refers to situations where each of the agents on the bus has successfully completed its snoop operations without further (if any) bus snoop stall cycles. More particularly, bus snoop stall cycles can occur for one or more of the agents on the bus that need to check their respective memory(s), such as a cache memory(s). These bus snoop stalls can be any number of clock cycles in duration. The snoop operations are complete when all snoop operations for the agents have concluded without any further bus snoop stall cycles. When these snoop operations have not completed as determined at decision block 106, one or more bus snoop stalls may have occurred. In these cases, information pertaining to the bus snoop operations are disregarded 108, and the determination 106 as to whether the bus snoop operations are complete continues. When the bus snoop operations have completed, the current state of the information pertaining to the bus snoop operations is recorded 110.

The particular "information" that is disregarded 108 or recorded 110 may be any desired/designated information that pertains to the bus snoop operations. Such information may relate to the agents, the target data, transaction and/or the like. For example, the information that may ultimately be recorded 110 may include the address of the target cache line or other memory location, transaction identifiers, and/or any other recordable information occurring in the system that may be useful for purposes of debugging, investigating or otherwise analyzing bus snoop activity. Therefore, the particular information designated for recording is not relevant to the present invention.

Information can be "disregarded" in various manners in accordance with the present invention. In one embodiment, the bus information may be monitored, but only recorded at the appropriate time. For example, information pertaining to bus snoop operations may be continually recorded, where the storage element(s) are selectively enabled to store the pertinent information when the bus snoop operations have completed. For example, memory enable signals may be used to enable the memory for storing the information upon recognition of a signal indicating that all agents have completed the snoop function. As described more fully below, this can occur where, for example, all agents on the bus raise a HIT or HITM signal indicating that there has been a cache hit or miss. In other embodiments, the information may be disregarded by selectively disabling monitoring functionality such that information associated with stalled bus snoop cycles is not monitored, and therefore will not be recorded. For example, a signal may be derived from the HIT/HITM or analogous signals from each of the agents, and when such signals indicate completion of the snoop phase, the state of the bus may be enabled to be monitored. These and other manners of selectively disregarding information otherwise available in connection with bus snoop stalls may be used in connection with the invention.

One intended result of a method according to the embodiment of FIG. 1 is to avoid storing information during bus snoop stall cycles. If bus snoop history is captured during the period when a snoop is stalled, analysis of the snoop information is significantly more difficult due to the number of history entries made for the snoop. The information associated with a successful snoop phase may be the most relevant to a person responsible for analyzing history data. Without the benefit of the selective recording aspects of the invention, stored information related to a successfully completed snoop phase would have to be extracted from a volume of data that includes irrelevant information associated with periods of bus snoop stalls. Further, the number of successfully completed snoop operations would be significantly reduced due to the infiltration of such irrelevant information into history memories having capacity limitations.

Figure 2:
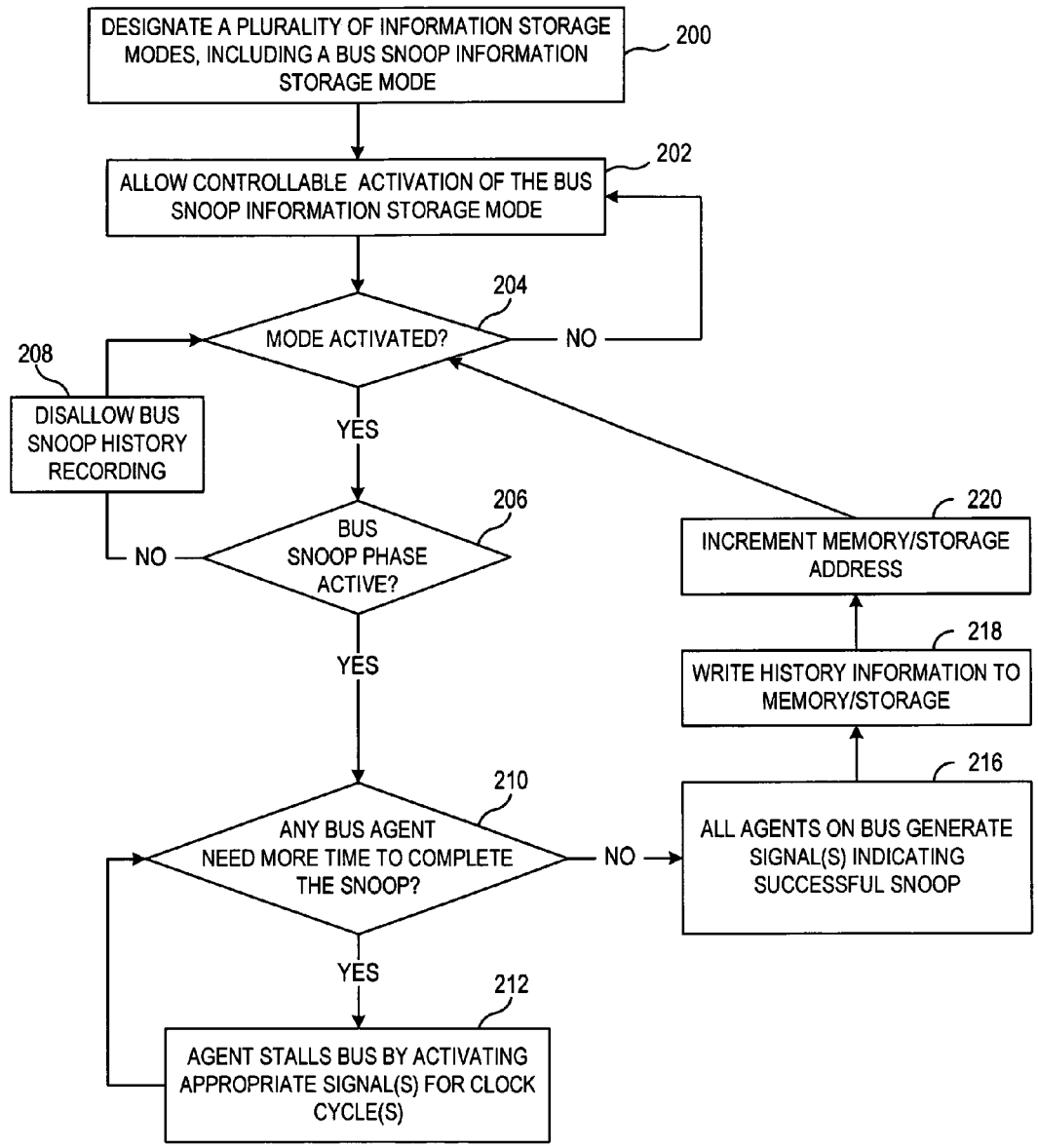
FIG. 2 is a flow diagram illustrating more particular embodiments of methods for selectively storing information associated with bus snoop operations.

FIG. 2 is a flow diagram illustrating another embodiment of a method for recording pertinent information associated with bus snoop operations in a computing system. Various information storage modes are designated 200, at least one of which is a bus snoop information storage mode. Controllable activation of the bus snoop information storage mode is allowed 202. It should be recognized that in some embodiment of the invention, activation of the bus snoop information mode may not be controllable, in that it may be implemented such that it is always activated and is not controllable in the sense that it can be changed without design modifications. For example, one example of a controllable activation includes a status or dynamic scan operation, where control information is scanned into the appropriate register(s) to activate the bus snoop information storage mode. Application-level programs may be alternatively or additionally used with scan operations to effect the control.

If the bus snoop information storage mode is activated as determined at decision block 204, it is determined 206 whether the bus snoop phase is active. The bus snoop phase as used herein refers to the collective activity of the bus snoop operations of the various agents for a particular event, such as a cache read or write operation. If the bus snoop phase is not active, bus snoop history recording is not enabled or otherwise allowed as shown at block 208. If the bus snoop phase is active, it is determined 210 whether any of the bus agents associated with the snoop need more time to complete the snoop; i.e., whether the bus snoop has stalled. If any bus agent needs more time to complete the snoop, that agent(s) stalls the bus as shown at block 212. This can be accomplished in various manners, such as by activating the appropriate signal(s) for a number of clock cycles. In one embodiment, this is accomplished by simultaneously activating two signals (HIT and HITM signals) for a period of one clock cycle, which thereby represents a bus snoop stall cycle. However, any desired signal(s) asserted for any desired time may be used as the bus snoop stall cycle. Information occurring during these bus snoop stall cycles is disregarded, and accordingly bus snoop history recording is not performed.

It is determined 210 whether any bus agent needs more time to complete the snoop, until all agents on the bus indicate a successful snoop as generally indicated at block 216. In one embodiment, the agents indicate a successful snoop by generating the appropriate signal(s). In one embodiment, completion of a successful snoop phase is indicated when all agents on the bus have asserted neither or one of two signals (HIT and HITM). In other words, a successful snoop operation in this embodiment is indicated by the assertion of less than all of the designated HIT and HITM signals, as assertion of both of these signals indicates a bus snoop stall as described above.

When the successful snoop has completed, the relevant information, or "history" information, is stored as shown at block 218. Thus, the history information is written to a memory (e.g., random access memory) or other storage media, and the process can continue for further snoop activities. In some embodiments, the history information is stored in a non-volatile memory/storage such that the history information is available even after power down of the system. However, any memory/storage may be used in connection with the invention. It should be understood that references to history "memory" as used herein refers to any type of storage, memory or other recording media, regardless of the particular technology or media utilized. According to one embodiment, the memory address is incremented 220 to the next available memory location after an entry has been made, such that the memory is prepared to receive the next entry.

Figure 3:
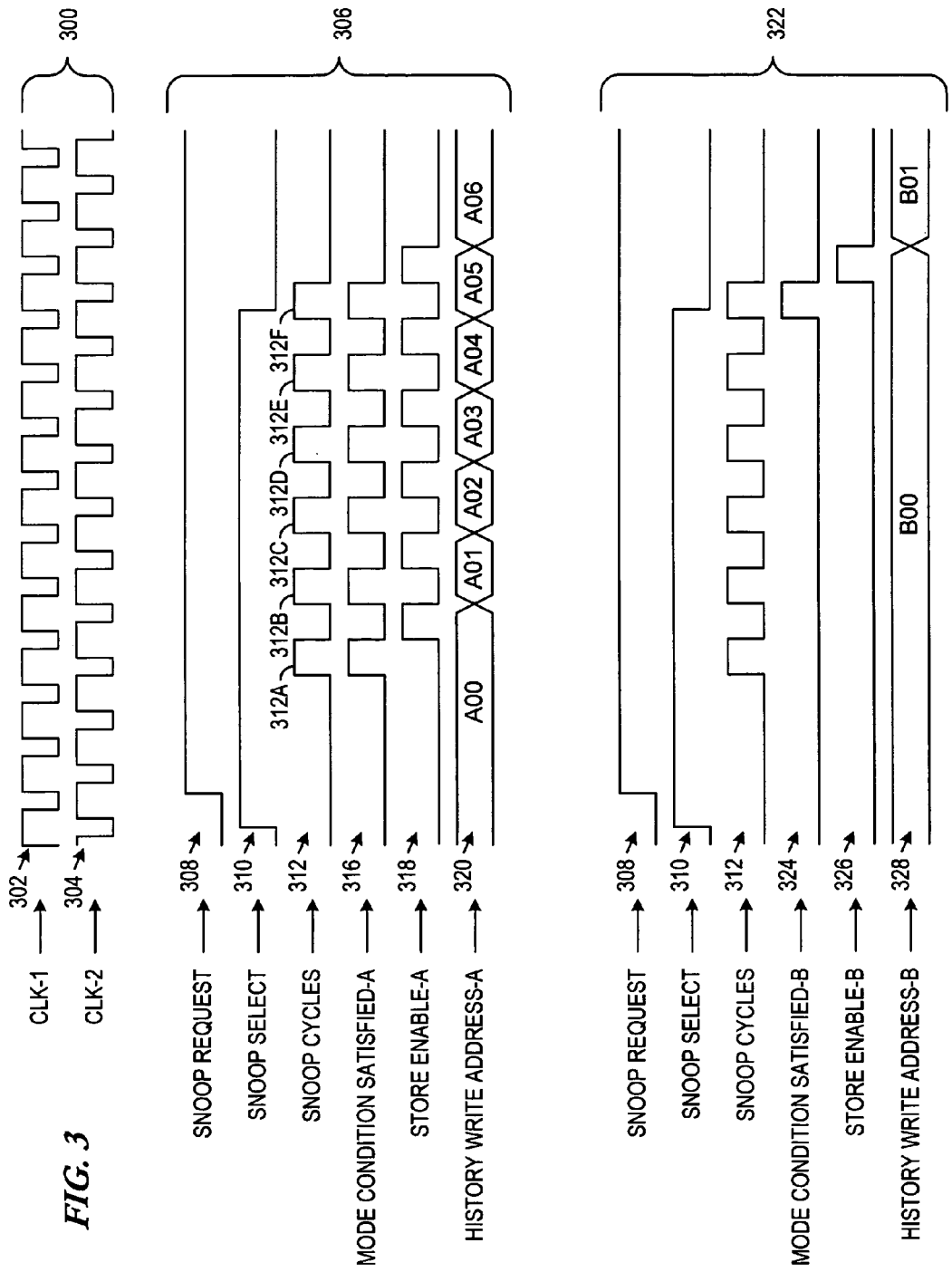
FIG. 3 is a signal diagram illustrating a representative embodiment for capturing snoop history data only when a snoop phase of the system bus is complete.

FIG. 3 is a signal diagram illustrating a representative embodiment for capturing snoop history data only when a snoop phase of the system bus is complete. One or more system clock signals 300 may be utilized. In the illustrated embodiment, multi-phase clocking is utilized which includes the CLK-1 302 and CLK-2 304 signals.

Signal group 306 illustrates some representative signals involved in a bus snoop activity where information associated with bus snoop stalls is written regardless of whether the snoop activity has stalled or not. A snoop request 308 is issued by at least one agent, where this snoop request 308 indicates an active snoop for which the cache or related storage controller needs to respond with cache hit/miss information. A snoop select 310 signal is previously asserted to indicate to the storage controller which (if there are multiple) snoop address is valid for the current snoop request. A number of snoop cycles 312 occur, which indicate to the storage controller that the current snoop is not being stalled by any other agent on the system bus. The mode-condition satisfied-A 316 signal is activated on each snoop cycle 312A-312F, as the condition is that a snoop cycle occurred. Thus, this signal 316 indicates a valid event has occurred for which history information may be recorded. The store enable-A 318 provides an enable signal to the memory device storing the snoop history, and provides an enable signal each time the mode condition satisfied-A 316 is asserted. A new history write address-A 320 (illustrated by addresses A00-A06) is generated each time the store enable-A 318 signal is asserted, and the memory is thus allowed to store information on each asserted cycle of the store enable-A 318. Thus, for each snoop cycle 312A-312F, snoop information is stored in the memory, even though the snoop phase has not completed and much of this information may be irrelevant or otherwise not useful.

Signal group 322 illustrates some representative signals involved in a bus snoop activity where information associated with bus snoop stalls is not written to the history memory when the snoop activity has stalled, in accordance with the present invention. In the illustrated embodiment, signals 308, 310, 312 represent the same signals for signal group 322 as was previously described in connection with signal group 306. In this embodiment, a bus snoop information storage mode is provided, which is satisfied only upon completion of the snoop activity, as shown by the mode condition satisfied-B 324 signal. The store enable-B 326 is asserted in response to the mode condition satisfied-B 324 signal being asserted. A new history write address-B 328 occurs only in connection with the store enable-B 326 being asserted, such that information is stored at history write address B00 only when the snoop phase has completed.

The present invention may be utilized in computing systems employing bus snooping or other analogous monitoring functions for maintaining cache or other memory coherency. Examples of such computing systems may be determined as described herein, and/or as described in co-pending U.S. patent application Ser. No. 10/330,829, filed on Dec. 27, 2002, which is incorporated herein by reference in its entirety and is described more fully in the ensuing description.

Figure 4:
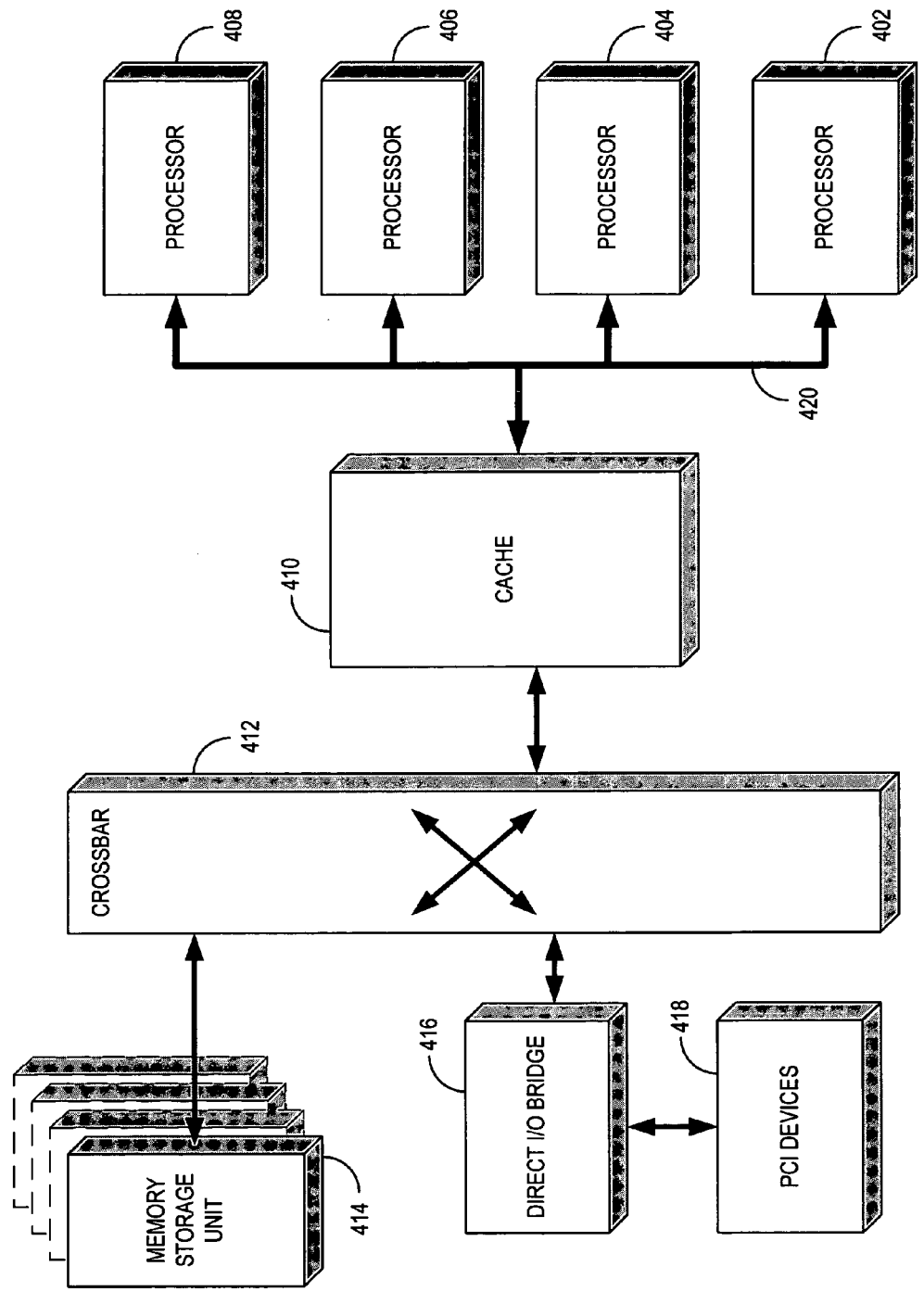
FIG. 4 illustrates a block diagram of an exemplary computing system in which the principles of the present invention may be implemented.

FIG. 4 illustrates a block diagram of an exemplary computing system in which the principles of the present invention may be implemented. A processing cell, or sub-pod, may include multiple processing units 402-408 and a corresponding cache memory(s) 410. Each of the processing units 402-408 share cache 410 through bus 420, where bus 420 may serve multiple processing units and/or other agents. One or more memory storage units 414 provide a shared memory pool for processors 402-408 through non-blocking cross-bar 412. Direct Input/Output (I/O) bridge 416 provides high-throughput access to peripheral component interconnect devices 418. It should be understood that the present invention is not limited for use with the processing arrangement identified in FIG. 4, but rather may be used with any processing arrangement that involves bus snoop operations.

Memory storage unit (MSU) 414 may include multiple memory banks, such as Random Access Memory (RAM). Likewise, cache 410 may include multiple banks of cache (not shown), each of which has significantly faster access times than the RAM. In one embodiment, each cache bank has a dedicated, direct connection to each of the MSUs 414, each direct connection being supported by crossbar 412. Each MSU 414 may handle hundreds of access requests concurrently, and supports interleaving between each MSU 414 to provide higher performance. When interleaving is enabled, data may be spread across all MSUs 414 and may be accessed in parallel by any of processors 402-408 and/or cache 410. Crossbar 412 allows for fast, consistently low latency, high bandwidth transmissions between cache 410 and I/O bridge 416.

Figure 5:
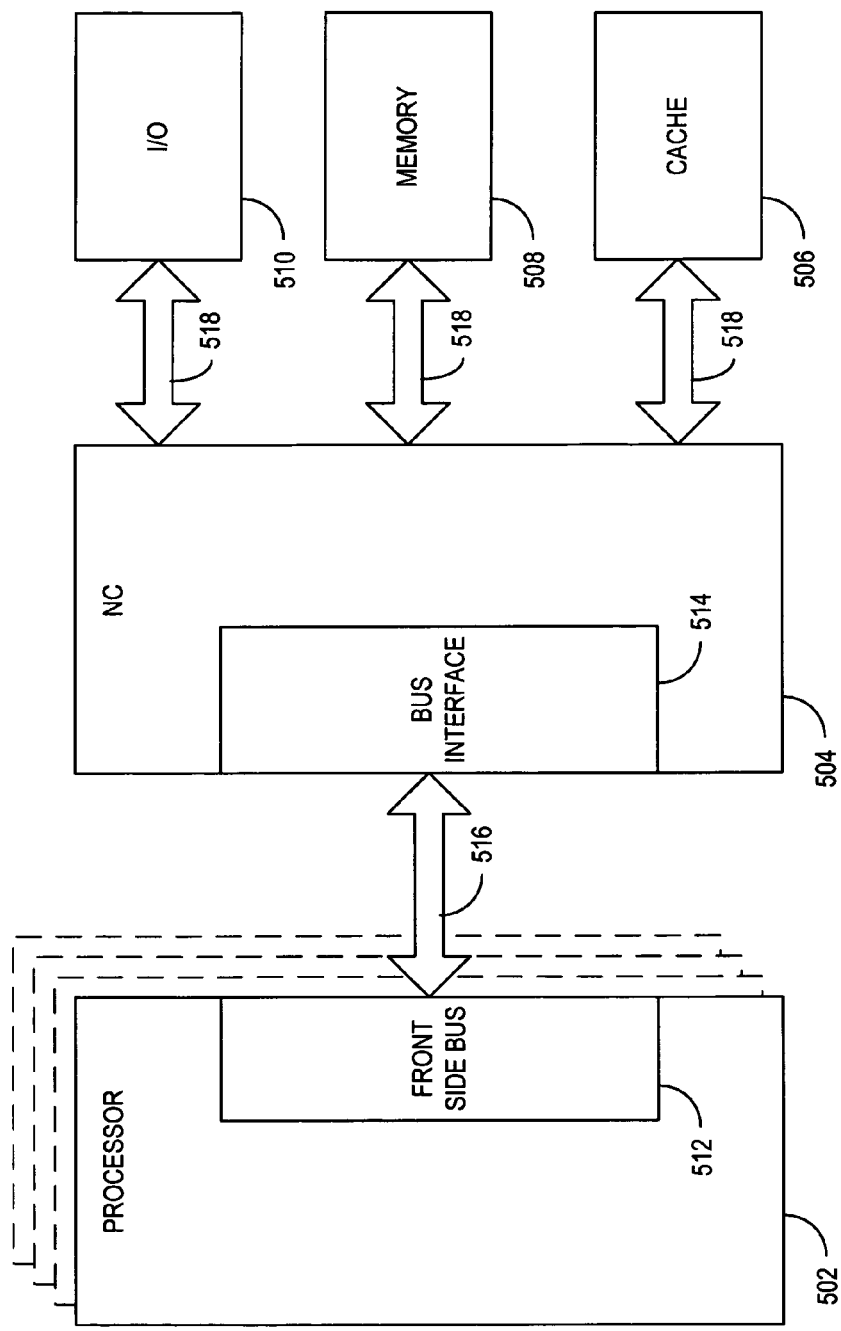
FIG. 5 is a block diagram illustrating representative bus interface components used to manage bus access between agents and other components on the system bus.

FIG. 5 is a block diagram illustrating representative bus components associated with the processors 402-408 and bus controller used to negotiate bus access between processors 402-408, I/O 510, memory 508, and cache 506. Processors 502 each contain a Front Side Bus (FSB) module 512. Node Controller (NC) 504 provides the processor system Bus Interface 514 and cache controller chip for processors 502 operating on common system bus 516. NC 504 may reside on the sub-pod module with the processors 502, and in one embodiment serves as the central agent on the processor system bus to allow interactions between processors 502, cache 506, MSU 508, and I/O 510.

NC 504 facilitates access to cache 506 to provide quick access to commonly used cache lines that are requested on system bus 516. The data portion of cache 506 may reside in Static RAM (SRAM) external to NC 504, where a corresponding on-chip tag RAM keeps track of state and control information for the resident cache lines. In operation, copies of frequently accessed state and control information, referred to as cache blocks or "cache lines," are maintained in the SRAM portion of cache 506. Each cache line is marked with a block address, referred to as a tag, so that cache 506 knows which part of the SRAM memory space the cache line belongs to. In one embodiment, the collection of cache tags for each memory block contained within the SRAM is contained within the on-chip tag RAM. For example, if cache line $B_j$ containing data entries $D_j$ is assigned to a portion of SRAM called $M_1$, then $B_j$ is in the on-chip tag RAM and $D_j$ is contained within the SRAM of cache 506. Cache 506 is a non-inclusive cache, meaning that not all cache lines resident in the processor's cache are necessarily resident cache 506.

In operation, node controller 504 can decode Front Side Bus (FSB) 512 transactions on system bus 516 into coherent memory requests and non-coherent memory requests. Coherent memory requests are controlled under the MESI protocol throughout the system and cache 506. Memory within a multiprocessor system in which every memory read and every memory write is instantly known by each processor within the system is known as coherent memory. Coherent memory requests, therefore, communicate the memory data accessed by one processor to the other processors on the bus through the use of a bus snooping function, so that stale data is not used. Coherent memory requests on system bus 516 are monitored by the bus snooping function and communicated to all processors 502 or other agents on the bus 516. Non-coherent requests, on the other hand, refer to requests such as memory-mapped I/O, interrupts, and other special transactions which do not use cache 506.

Communication between NC 504, I/O 510, memory 508 and cache 506 is conducted via interface 518, which in one embodiment is implemented using a crossbar such as the crossbar 412 discussed in connection with FIG. 4. In one embodiment, the crossbar operates as a multi-input, multi-output, non-blocking electronic switch, where access from NC 504 and external components is unimpeded, thereby removing potential bottlenecks. The number of processors 502 operating in conjunction with NC 504 is advantageously limited in order to avoid excessive bus contention on system bus 516, especially in consideration of the bus snooping function as discussed above.

Data transfer on bus 516 may be implemented on varying width buses to include 32, 64 and 128 bit buses and beyond. The clocking rate on bus 516 is typically in the range of several hundred MegaHertz (MHz), and data may be transferred on both the rising and falling edges for double-pumped operation of the system bus clock to achieve an effective system bus 516 bandwidth of several GigaHertz (GHz). In addition, varying phases of the system bus clock may be used to implement even higher effective bus clock rates, such as providing two rising edges and two falling edges within a clock period for a quad-pumped operation of the system bus clock. Processors 502 are responsible for obeying any bus specification that may exist for bus 516 between front side bus 512 and Bus Interface 514.

Bus interface 514 interfaces node controller 504 to front side bus 512 for each processor 502. Bus interface 514 provides various functions. Exemplary functions include a request queue that allows NC 504 or processors 502 to generate bus requests; an in-order queue to receive bus requests from processors 502; a snoop interface to provide address and function information necessary to snoop NC 504 tag RAM and then to provide the tag status to the snoop interface; response cycle generation to complete bus operations; generation of deferred phase operations; and a data transfer interface to provide the control and necessary data queues to transfer data bus reads, writes, interrupts and special transactions.

Figure 6:
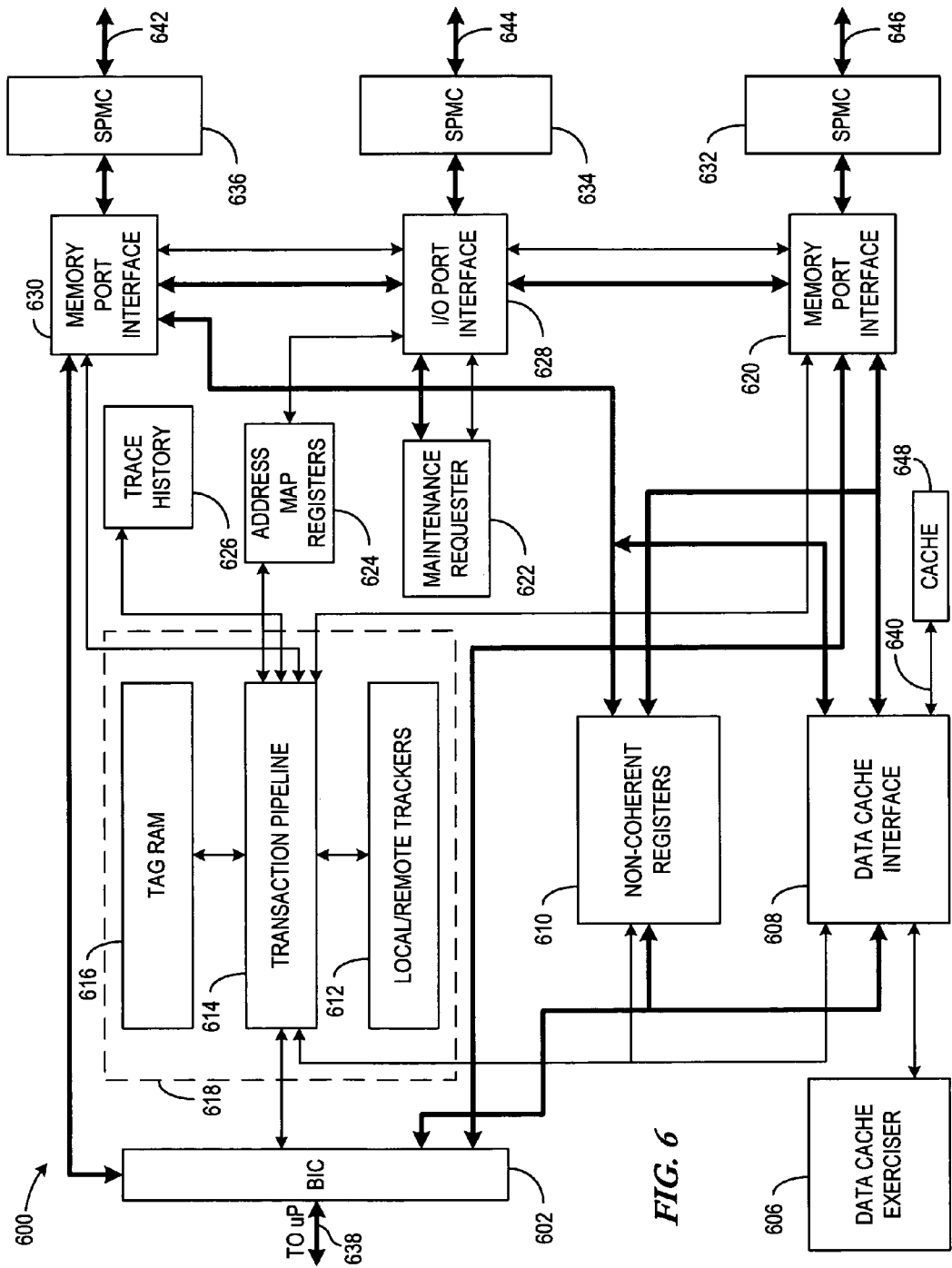
FIG. 6 is a block diagram illustrating an exemplary Node Controller (NC) which may be used to store the bus snoop information in accordance with the invention.

FIG. 6 is a block diagram illustrating an exemplary Node Controller (NC) 600. In one embodiment, bus interface controller 602 is coupled to system bus 638, which is the system bus for the processors attached to the particular sub-pod of interest. Bus Interface Controller (BIC) 602 interconnects through a data bus to memory port interfaces 620 and 630 as well as to data cache interface 608. Transaction processor 618 includes Tag RAM 616, Transaction Pipeline (TP) 614 and local/remote trackers 612. Tag RAM 616, transaction pipeline 614 and local/remote trackers 612 are each interconnected through a control bus, and transaction pipeline 614 is interconnected to BIC 602 through a control bus. Transaction pipeline 614 also provides control through a control bus to address map registers 624, trace history 626, Memory Port Interfaces 630 and 620. The trace history 626 represents the history control functions and memory(s) that can store the bus snoop history information in accordance with the present invention, and is described more fully below.

A data bus interconnects BIC 602 and non-coherent registers 610 and data cache interface 608. A data bus also interconnects non-coherent registers 610 and data cache interface 608 to memory port Interfaces 620 and 630. Data cache interface 608 is interconnected to cache 648 that may be separately located, e.g. off-chip, from data cache interface 608. Maintenance requestor 622 and I/O Port interface 628 are interconnected by both a data bus and a control bus. A control bus interconnects address map registers 624 to I/O port interface 628. Data and control bus interfaces exist between I/O port interface 628 and memory port interfaces 620 and 630. Scalability port memory controllers 632, 634, and 636 interconnect through a data bus to memory port interface 620, I/O port interface 628, and memory port interface 630, respectively. Data buses 642 and 646 interconnect scalability port memory controllers 636 and 632, respectively, to the respective MSU associated with the particular sub-pod assembly. Dual data buses 642 and 646 are provided to node controller 504 to allow for fault tolerant functionality, parallel processing, etc. Scalability port memory controllers 644 transfer data between I/O port interface 628 and PCI devices 418 as depicted in FIG. 4 and I/O devices 510 as depicted in FIG. 5.

In operation, NC 600 provides the functions required to facilitate processor bus operations on bus interface 638. In particular, NC 600 performs various functions including: out-going queuing for outgoing requests to be sent out to BIC 602; in-order queuing for incoming requests from BIC 602; response control for all bus requests; datapath for data transfer and control between MSUs; I/O interface module to facilitate access to PCI devices; history stack for BIC 602 history capture; error checking to collect and check all errors, etc. Other major interfaces accommodated by NC 600 include the interface between the BIC 602 and transaction pipeline 614, which handles control signals and address/function signals, data transfers between BIC 602 and data cache interface 608, data transfers between BIC 602 and MSU-0 (not shown) on interface 642, data transfers between BIC 602 and MSU-1 on interface 646, and non-coherent data transfers between BIC 602 and non-coherent registers 610.

The out-going queue function receives requests to be sent to BIC 602 from either transaction pipeline 614, memory port interface 630, or memory port interface 620. The requests are individually strobed into a priority selection block which acknowledges and grants execution of the request according to a prioritized selection algorithm, or held for later processing within the out-going request queue. Each of the requesting entities places information concerning the request type, which may be represented by a multi-bit bit digital code identifying one of a number of possible request types. Likewise, an in-order queue is utilized to store requests received from the processor on BIC 602 pertaining to, for example, snoop requests or write transactions sent from the processor.

The request signals include, for example, an active low address field used to identify the recipient of the request, as well as a parity field to maintain an even number of active low signals on the address bus. Likewise, the request field may be maintained with even parity by an associated request parity bit. In one embodiment, the lower three bits of the address field are mapped into byte enable signals, which allows for a programmable number of bytes to be transferred in a given transaction. The programmable number of bytes for transfer in a single clock transition is, for example, 0 to 8 bytes.

Response signals are generated in response to the requests received, and provide status for the requests that have been received. Each response signal may includes response status field, whose parity is held even, in one embodiment, by a response parity field. Additionally, a target ready bit is maintained within the response signal to allow the receiving party to signal its readiness for write data or writeback data, if a data write is appropriate for the particular request. For transactions with an implicit writeback, the target ready bit is asserted twice, first for the write data transfer and second for the implicit writeback data transfer.

Data response signals control the transfers of data on bus interface 638. The agent responsible for transferring data on the data bus is responsible for indicating that data on the bus is valid and that the data should be latched. The data bus agent may, for example, assert a ready bit at both the rising edge and falling edge of the bus clock for double-pumped operation. Additionally, the ready bit may be de-asserted by the transmitting entity in order to insert wait states into the data phase. Bus interface 638 may represent, for example, a 32, 64, or 128 bit width or higher, and may be enabled for individual bytes within bus 638. For example, if bus interface 638 is 64 bits wide, then the bus is capable of transferring 8 bytes of data at a time, where each byte includes 8 bits. In one embodiment, a multi-bit byte enable field can then be used to provide information as to which bytes of data are valid on the 64-bit bus. Additionally, the data transferred on bus 638 may be error correction-coded regardless of which bytes are enabled.

Figure 7:
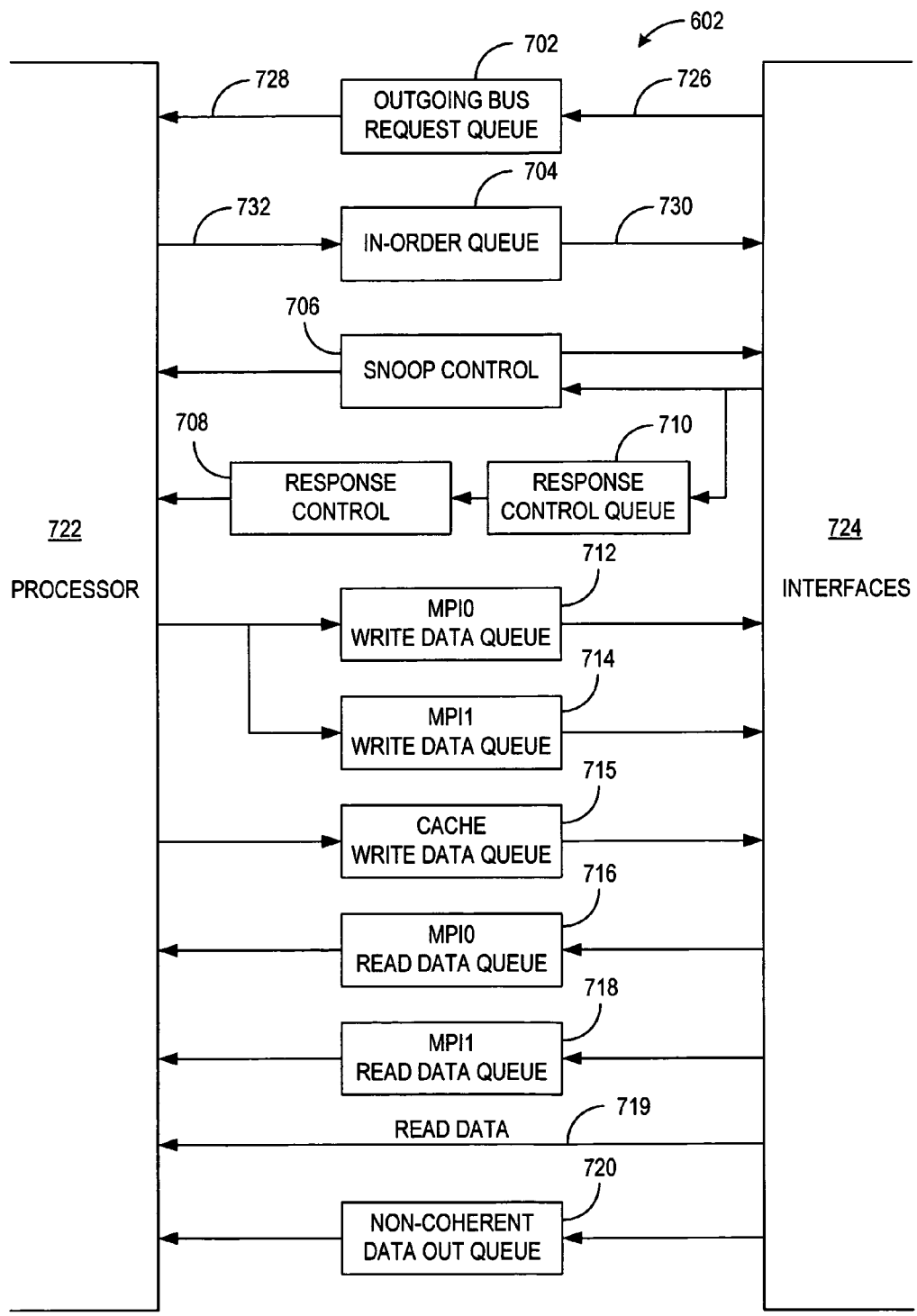
FIG. 7 illustrates a functional block diagram of a representative Bus Interface Controller (BIC) that may be used in a computing system employing the principles of the present invention.

FIG. 7 illustrates a functional block diagram of an exemplary Bus Interface Controller (BIC) such as the BIC 602 illustrated in FIG. 6. Processor 722 may represent one of many processors adapted to contemporaneously interface with other modules/interfaces 724 of the system, such as to the memory interface, cache interface, pipeline, etc. Generally speaking, there are multiple phases of operation of BIC 602, including arbitration, request, snoop, response, and data. Arbitration phase operation of BIC 602 allows for one of processors 722 or other agents to obtain control of bus interface 638 shown in FIG. 6, or alternatively to allow other interfaces 724 to obtain control of bus interface 638, during one or more bus clock cycles. Arbitration phase is entered when one of Processors 722 asserts a bus request signal or another interface 724 asserts the bus request signal. A number of agents may simultaneously arbitrate for the request bus, where processors 722 represent symmetric agents and the other interfaces 724 represent priority agents. In one embodiment, owning the bus is a necessary precondition for initiating a transaction. The symmetric agents arbitrate for the bus based on a desired arbitration scheme, such as a round-robin rotating priority scheme. In one embodiment, priority agent bus requests override symmetric agent bus requests, where the priority agent bus request is always the next bus owner. The response to the bus request signal is assertion of a bus priority signal to the requesting device having priority, thereby relinquishing control of the bus to either the symmetric agents or the priority agent. Bus blocking control may be asserted by any of the bus agents to block further transactions from being issued to the request bus, in such instances, for example, when system resources, such as address and data buffers, are about to become temporarily busy or filled and cannot accommodate another transaction.

The request phase of BIC 602 is entered when either processors 722 or interface 724 modules have successfully arbitrated for bus control. With reference to both FIGS. 3 and 4, request signals may be provided by transaction pipeline 614, memory port interface 630, and memory port interface 620 via interfaces 724, and bus request signals may be provided by processor 722 in order to generate snoop requests. Assertion of an address strobe signal defines the beginning of the request transaction. An active low address is provided along with the address strobe signal as part of the request. The low three bits are mapped into byte enable signals to accommodate, for example, 0 through 8 byte transfers per clock cycle. In one embodiment, even parity is used to ensure that an even number of active low signals exist throughout the entire request signal.

Outgoing bus request queue 702 receives bus requests from one or more modules/interfaces 724 via interface 726 and provides the requests via interface 728 to the addressed processor 722 of the request. Likewise, in-order queue 704 receives bus requests from processor 722 via interface 732 and provides the bus requests to the addressed recipient via bus 730. Each of outgoing bus request queue and in-order queue may be limited to, for example, a depth of eight and are responsible for queuing up requests from interfaces 724 and Processor 722 respectively. Handshake signals are used between outgoing bus request queue 702 and modules/ interfaces 724 and also between in-order queue 704 and processor 722 in order to throttle the number of requests received by each of queues 702 and 704. Additional signaling is provided by outgoing bus request queue 702 when the queue has been filled to a predetermined depth. If, for example, the predetermined depth is five and the overall queue depth is eight, then three extra slots are provided in outgoing bus request queue 702 to allow for potential requests that may be waiting in transaction pipeline of FIG. 6. Each of processors 722 monitors the in-order queue 704 and will stop sending requests when the queue is full.

Snoop phase operation may be controlled through the combined operation of in-order queue 704 and snoop control 706 and is required to maintain cache coherency. With regard to FIGS. 2 and 3, memory port interfaces 630 and 620 provide write and read access to, for example, memory 508. Memory reads are cached into cache 648 by data cache interface 608, whereby subsequent access to the same memory space results in a memory read from cache 648 instead of a memory read from memory 508, resulting in a shorter memory access time. Memory 508, however, represents shared memory space to each processor 722. Data read from memory 508 and subsequently cached during one clock cycle from a first processor 722 may be invalidated by a subsequent write to the same address in memory 508 by a second processor 722.

Snoop control 706 is used to provide snoop control of cache 648 to processors 722, while in-order queue 704 receives snoop requests from processors 722. In operation, snoop signals from snoop control 706 allow processors 722 to determine whether an unmodified, requested cache line exists within cache 648, resulting in a cache hit; a modified, requested cache line exists within cache 648, resulting in a cache hit to a modified cache line; or no cache line exists within cache 648, resulting in a cache miss. The snoop signals from snoop control 706 are used to maintain cache coherency at the system level. These signals therefore provide an indication that the on-chip cache line within the snooping agent (e.g., Processor 722) is valid or invalid, whether the cache 648 line is in a modified (also referred to as "dirty") state, or whether the transaction should be extended until such time that a valid snooping state may be determined.

The response phase of BIC 602 is controlled by response control queue 710 and response control 708, and are responsive to requests received by in-order queue 704. A responding agent within the modules/interfaces 724 is responsible for processing requests at the top of in-order queue 704, where the responding agent is the agent being addressed by the request, e.g., memory port interface 630 during a memory read of memory 508 of FIG. 5, or alternately a memory read of cache 648 if cached memory is present. Each response includes a response identifier, which is used to provide a response code to be placed on bus interface 638 during the response phase of BIC 602. The response code identifies, for example, a result of a bus snoop initiated by one of processors 722. The results of the bus snoop may indicate that normal data was found, that no data was found, that the request is to be deferred, or that the request is to be retried. It should be noted that if the response code indicates that either a retry or deferral is necessary and snoop control 706 indicates that cache 648 is in a modified state, then the retry or defer response code will be implicitly changed to an automatic writeback from memory 508 of FIG. 5, where cache 648 will provide itself as a target to maintain data coherency between cache 648 and memory 508.

The data phase of BIC 602 operates to transfer data between memory port interface 620 and related memory port interface-0 write data queue 712 and memory port interface-0 read data queue 716, and between memory port interface 630 and related memory port interface-1 write data queue 714 and memory port interface-1 read data queue 718. Cache data may also be transferred from the processor 722 to cache via the cache write data queue 715, and to the processor as shown on path 719. Non-coherent data out queue 720 operates to transfer data contained from local registers within interfaces 724 to processors 722. A byte enable field may be used to enable multiple data bytes on the data bus per transfer cycle.

Bus transactions on bus interface 638 of FIG. 6 occur at a rate that may be on the order of several GigaBytes per Second or higher, and are generally characterized as being of the arbitration, request, snoop, response and data phase types. Trace history 626 of FIG. 6 represents a memory/storage for trace history of system bus transactions on bus interface 638. Trace history 626 may be operated in various modes, such as data capture mode or data read mode. In data capture mode, data is captured and stored, i.e., recorded, according to a predetermined trace configuration. In data read mode, data that was previously recorded is retrieved from the trace history memory. In one embodiment, data is retrieved using a dynamic scan operation, and is made available for retrieval via maintenance software.

Figure 8:
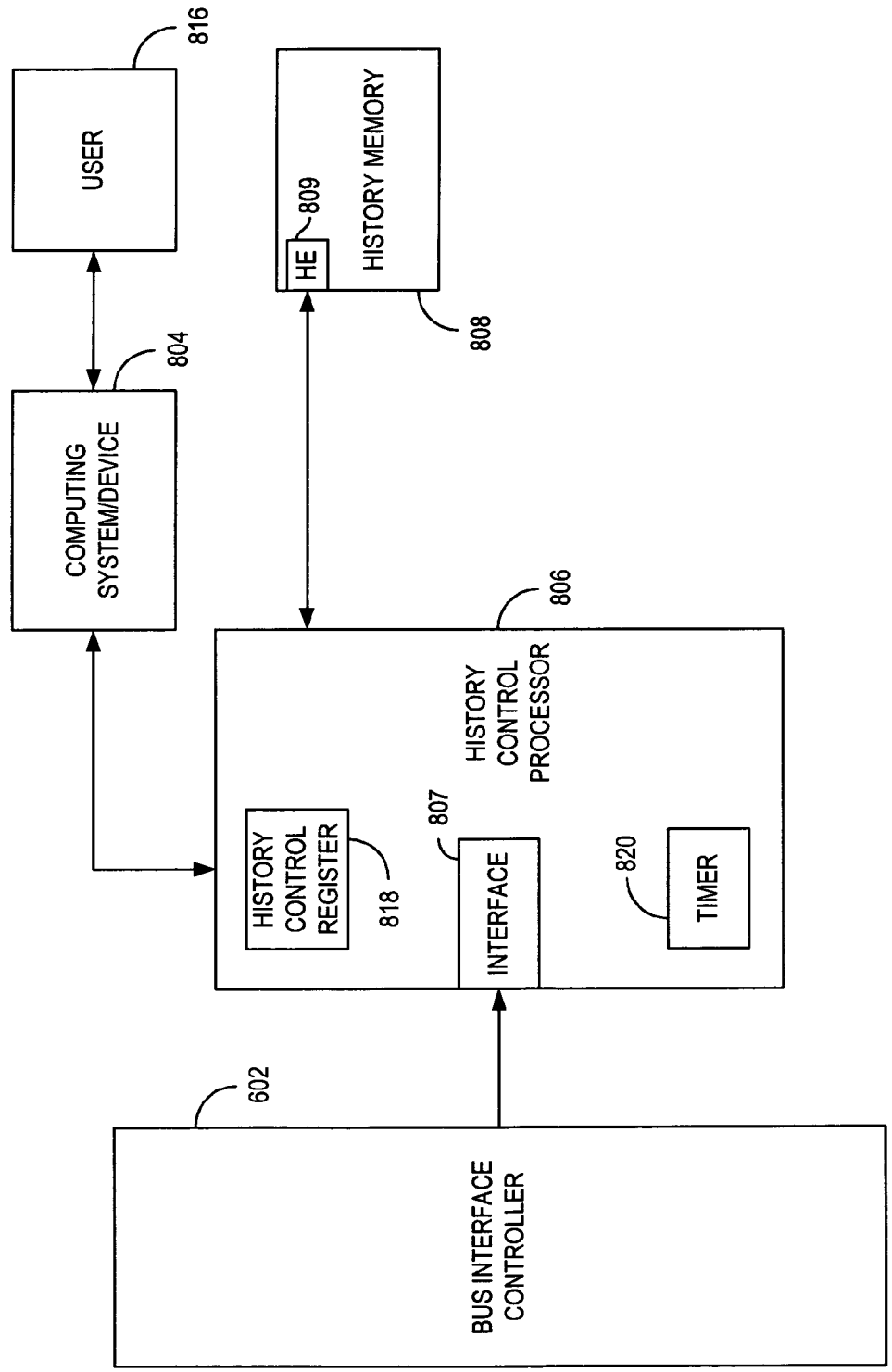
FIG. 8 illustrates a block diagram of an exemplary history trace apparatus that may be used in connection with the present invention.

FIG. 8 illustrates a block diagram of an exemplary history trace apparatus according to the principles of the present invention. User 816 operating at computing device 804 or other I/O device, is interconnected to history control processor 806. History control processor 806 operates to facilitate history trace operations, such that bus interface transactions provided by a bus interface controller, such as BIC 602, may be captured and stored for later analysis by history memory 808. The history control processor 806 includes an interface 807 to couple to the BIC 602 or other analogous device to receive the bus information that may ultimately be stored. The history control processor 806 may be implemented using a processing device, or may represent a functional module of other existing processor modules in the system. For example, the history control processor 806 may be integrated with the BIC 602 and utilizes the processing functionality of the BIC 602, or with other processors to perform the history control functions. Regardless of what particular processor(s) is used, the history control processor 806 represents processor-controlled functions to controllably store information in the history memory 808. In one embodiment, the information is controllably stored in the history memory 808 by controllably asserting a storage enable signal(s) to a history enable (HE) input 809 of the history memory 808.

User 816, having access to a multitude of maintenance functions, or scripts executable by computing device 804, is able to configure history control register 818 according a particular trace history requirement. In other words, user 816 may, through the use of computer 804, program the operation of history control register 818 to set up trace history capture modes such as the bus snoop information storage mode, and to establish mode parameters such as start record trigger events, stop record trigger events, and trace data format requirements. It should be noted that the "register" 818 represents any type of storage location, including processor registers, memory locations or other data storage element capable of storing the various configuration and mode identifiers. Further, when the trace history has been captured, user 816 may initiate a trace history data read from history memory 808 in order to analyze the trace history data.

Bus Interface Controller (BIC) 602 of FIG. 8 represents the BIC 602 of FIGS. 3 and 4. As discussed above, the BIC 602 may operate in various phases, including the arbitration, request, snoop, response, and data phases. History control register 818, through proper configuration by user 816 via computer 804, allows capture of specific data for each of the phases in response to a maskable history trace. Once a transaction occurring on BIC 602 meets the maskable history trace configuration within history control register 818 as programmed by user 816, data relating to the transaction is latched into history memory 808 for later retrieval. User 816 may access trace history data stored in history memory 808 by causing a dynamic scan of history control register 818 to place it in read mode, whereby trace data may be read from history memory 808, through history control register 818 and ultimately into a storage facility (not shown) associated with computing device 804.

One implementation of history memory 808 uses a 128-bit wide by 512-word deep RAM, capable of capturing up to 512, 128-bit data words. The various capture modes used to capture data in history memory 808 are user selectable via computer 804, where the occurrence of the selected capture mode event causes history data to be stored into history memory 808. The nature of the history data captured by history memory 808 is also user selectable via computer 804. In one embodiment, up to sixty-four capture modes, selectable by six capture mode control bits, may be used to capture BIC 602 history. In one embodiment, up to eight data format modes, selectable by three data format mode bits, may be used to configure the type of data captured by history memory 808. One example of a particular capture mode, Mode 1, captures BIC 602 history whenever the processor initiates a request A on the bus interface. The mode event in this instance, for example, is bus request-A initiated by one of processors 502 on front side bus 512 of FIG. 5. It should be noted that any number of capture modes and data format modes may be obtainable by simply extending the bit weight of each mode within history control register 818.

Figure 9:
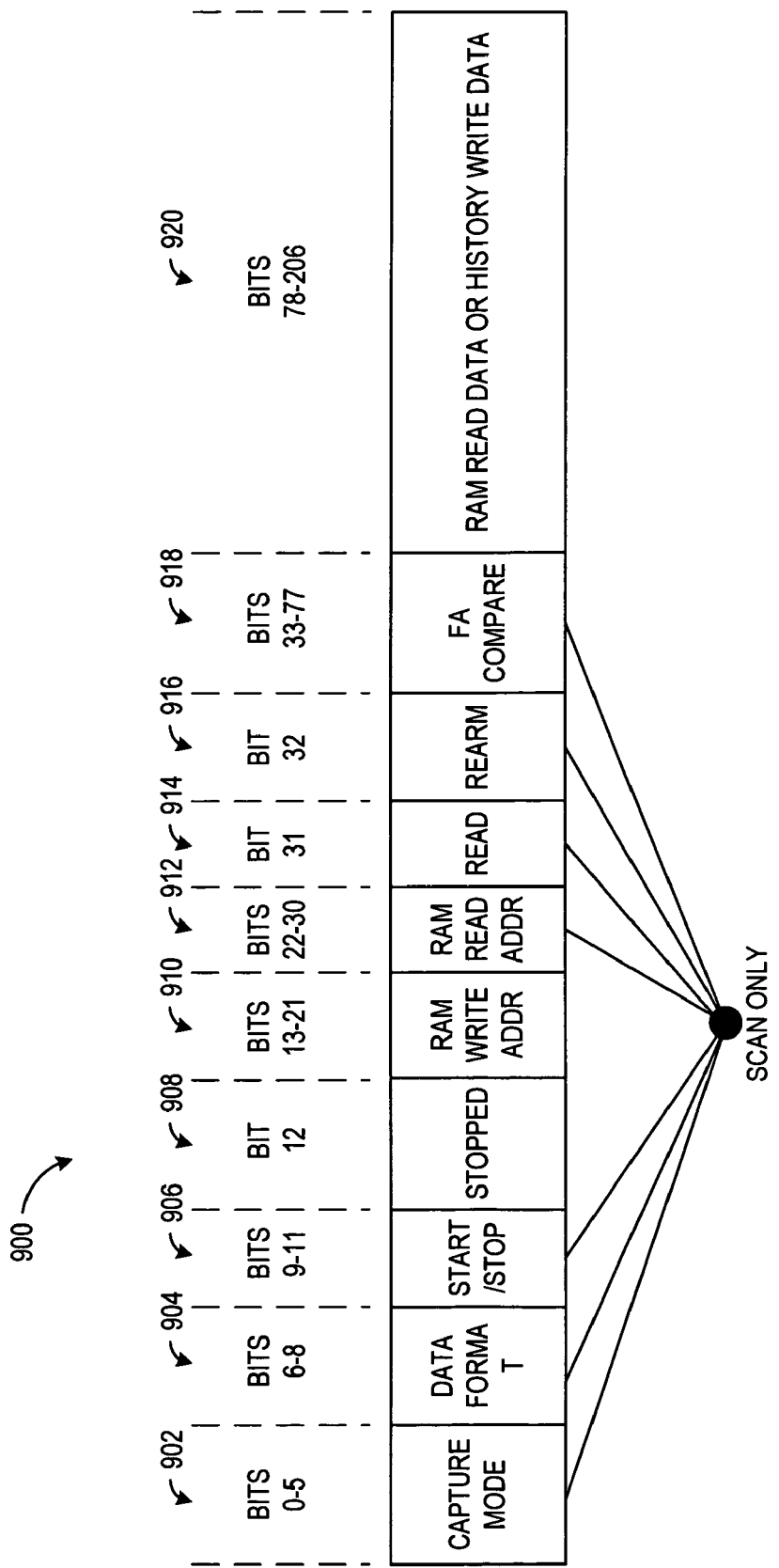
FIG. 9 illustrates an example of a history control register having a capture mode field for designating the bus snoop information storage mode according to the invention.

History control register 818, in one embodiment according to the present invention, is a dynamic scan register, where the scan only bits associated with the scan register are written only when history control register 818 is dynamically scanned. FIG. 9 illustrates one example of history control register 900 and associated control bits. Capture mode bits 902 may be configured at scan to determine the mode event of interest. Table 1 illustrates some exemplary capture modes according to the present invention.

TABLE 1

| Capture Mode Control Word | Capture Mode |
|---|---|
| 000000 | Capture at every bus clock cycle |
| 000001 | Capture on Request A |
| 000010 | Capture on Request B |
| 000100 | Capture on Snoop |
| 001000 | Capture on Response |
| 010000 | Capture on Data |
| 100000 | Capture on Deferred Phase |

Capture mode control "000000" corresponds to a capture mode that captures data at every bus clock cycle. Capture modes "000001" and "000010" refer to the request phase of BIC 602, capture mode "000100" refers to the snoop phase of BIC 602, capture mode "001000" refers to the response phase of BIC 602, capture mode "010000" refers to the data phase of BIC 602, and capture mode "100000" refers to a deferred response phase of BIC 602. All permutations of the capture mode control bits are allowable, which in this example, allows sixty-four possible permutations of trace mode control. It should be noted that the modes corresponding control codes in Table 1 are merely examples, and any other desired code may be used to represent the desired capture mode. For example, in another embodiment of the invention, a four-bit code is used to identify the desired capture modes.

Data format mode bits 904 of history control register 900 are scanned to control the data format of each 128-bit data word that is captured by history memory 808. Each of the eight data format modes that can be configured by data format bits 904 defines the meaning of each bit position within each 128-bit word that is captured within history memory 808. Given that a 3-bit field is provided with which to select the desired data format mode, a total of eight different data format modes may be selected for this embodiment. For example, data format modes that may be selected in accordance with the present invention include bus signals 1, bus signals 2, outgoing queue information, buffer tracker information, and I/O capture information. It should be noted that the type of data information gathered for any given data format mode is a design choice and may include many thousands of different combinations depending upon the specific application.

Bus signals 1, for example, may include Bus Interface information dealing with address fields where the address fields are shared for bus A and bus B signals, request fields where the request fields are also shared between bus A and bus B signals, snoop fields, response fields, in-order queue pointers and other miscellaneous bus interface signals. Bus signals 2, contains a concatenated set of the data fields for bus signals 1. For instance, parts of the address and request A and parts of the address and request B fields are included, along with some snoop, response, and pointer information. In general, the specific data format mode selected may be optimized for the specific capture mode selected according to Table 1. For example, the bus signals 1 data format mode is optimized for use with capture mode control word "111111", which activates all capture modes. Alternatively, the bus signals 2 data format is optimized for use with the "000001", "000100", or "001000" mode control words, which represent the request-a, snoop, and response capture modes, respectively. The bus signals 2 data format represents a condensation of varying bus phases into one capture history, which allows an increased amount of data to be captured as compared to, for example, the bus signals 1 data format.

Start/stop bits 906 of history control register 900 are scanned to control the commencement and cessation of recording. Table 2 lists the possible combinations of the start/stop control word according to one embodiment of the present invention. Most of the recording options provide an immediate recording option, where the stop recording triggering event may be for varying reasons such as when a stop recording command is received, a bus interface error occurs or when history memory 808 is full. Some other recording options, on the other hand, offer a start recording triggering event such as when function/address compare field 918 of history control register 900 is matched on the bus interface or when a bus interface error occurs, both of which may be stopped when history memory 808 is full. Stopped field 908 indicates that the recording session has ended due to a stop recording triggering event. Timer 820 of FIG. 8 keeps track of the amount of time elapsed from the start of a history trace to the end of a history trace and may provide the elapsed time data to history memory 808 for each record event, depending upon whether or not the elapsed time field is required for the particular data format modes being utilized.

In one embodiment, the timer 820 is implemented as an elapsed time counter which gets reset to zero after the associated history information is recorded to memory, at which time the elapsed time counter starts incrementing again.

TABLE 2

| Start/Stop | Action |
|---|---|
| 000 | Start recording immediately, stop when history memory 808 of FIG. 8 is full |
| 001 | Start recording immediately, stop when a bus interface critical or passive error is detected |
| 010 | Start recording immediately, stop when a stop command is received from computer 804 of FIG. 8 |
| 011 | Start recording immediately, stop when a stop command is received from the bus interface |
| 100 | Start recording immediately, stop when a function/address is received from the bus interface that matches the function/address previously loaded into FA Compare bit field 918 of FIG. 9 |
| 101 | Start recording when an FA Compare is detected, stop when the history memory 808 of FIG. 8 is full |
| 110 | Start recording when a bus interface critical or passive error occurs and stop when history memory 808 of FIG. 8 is full |
| 111 | Start recording immediately, stop only when the bus interface clock is stopped (free run) |

Fields 910 and 912 of history control register 900 contain an 8-bit pointer into history memory 808 of FIG. 8. Field 910 contains a pointer to one of 512 memory locations contained within history memory 808 and indicates the last valid data location plus one within history memory 808 when history control register 900 is scanned out. Field 912 of history control register goo contains a pointer to one of 512 memory locations contained within history memory 808, indicating the memory location to be accessed when history memory 808 read mode is active. A new read address is to be scanned into Field 912 for each history memory 808 read that is required.

Read field 914 of history control register 900 is a dynamic scan bit that either sets or clears history read mode. History read mode allows the contents of history memory 808 to be accessed and loaded into ram read data field 920 of history control register 900 for subsequent upload to computer 804 of FIG. 8, where post-record analysis can be performed on the recorded data. Once read field 914 has been set, recording of bus interface data is disabled until such time that a dynamic scan of history control register 900 clears read field 914.

Rearm field 916 is a dynamic scan bit that allows a reset of the history environment in preparation for a history capture session. Setting the rearm bit causes history control 806 to prepare for a new history capture session by performing various functions. These functions include resetting the write address to history memory 808; clearing any stop condition, which may be indicated by stopped bit 908 of history control register 900; clearing any start condition that may have been set by start/stop field 906 of history control register 900; and resetting the elapsed time counter contained within timer 820 of FIG. 8. Once the reset activity caused by setting rearm field 916 has finished, the rearm field will have no further effect until it is once again dynamically scanned in.

FA Compare field 918 contains function/address information, such that when start/stop field 906 is set to either "100" or "101", determines when the history trace function is either stopped or started, respectively. In other words, user 816 may, for example, cause a dynamic scan of history control register 818 to set start/stop field 918 to "101". User 816 may also, for example, dynamically scan in a function address of interest into FA compare field 918. Once an address appearing on BIC 602 of FIG. 8 matches the address scanned into FA compare field 918, an event trigger is issued, which causes data defined by data format field 904 to be written to history memory 808 of FIG. 8. Subsequent address matches will likewise cause data to be written to history memory 808 until it reaches capacity or until a stop command is received.

Field 920 of history control register 900 provides either read data from history memory 808 of FIG. 8 or write data to history memory 808. Field 920 provides read data from history memory 808 to computer 804 when history read mode is set by bit 914 of history control register 900. Alternately, field 920 provides write data from BIC 602 to history memory 808 when bit 914 is reset and a proper trace history triggering event has occurred.

Figure 10:
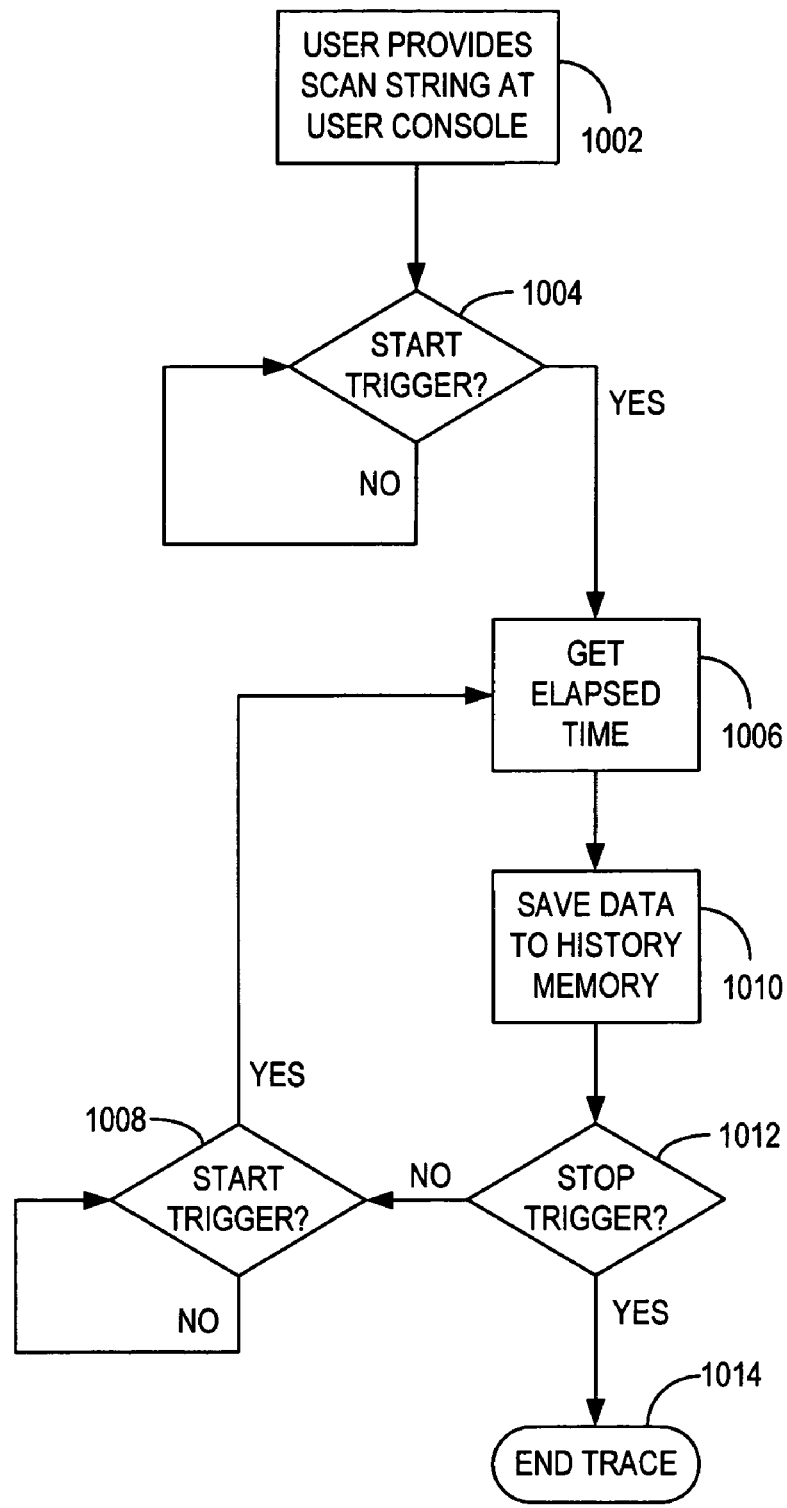
FIG. 10 illustrates a flow diagram of an exemplary write mode operation using triggering events to initiate data storage.

FIG. 10 illustrates a flow diagram of an exemplary write mode operation of the history trace apparatus as depicted in FIG. 9. In preparation for gathering a trace history, a user defines a dynamic scan string via a system console, laptop computer, or any other suitable I/O device in step 1002. The dynamic scan string is effective to define the scan only bits of history control register 900 as illustrated in FIG. 9. Once write mode has been established, the history trace may either commence immediately or history control 806 of FIG. 8 continuously monitors BIC 602 for bus interface errors or a match between an address appearing at BIC 602 that matches FA Compare field 918 of FIG. 9, as illustrated in step 1004.

When the history trace is triggered, an elapsed time is retrieved at step 1006 along with the customized data report as defined by data format field 904 of FIG. 9, and both may be written to history memory 808 of FIG. 8. If a stop trigger has not been received at step 1012, either by command or by capacity limits set by history memory 808 of FIG. 8, then another start trigger is queried in step 1008 exactly as in step 1004. Once the stop trigger has been received, history trace write mode commences at step 1014. User 816 of FIG. 8 is then able to retrieve the history trace saved into history memory 808 by first setting the scan string at computer 804 such that read mode is established for history control register 818 of FIG. 8. Once read mode is established, data may be transferred from history memory 808 through history control register 818 into computer 804 for analysis.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A method for recording pertinent information associated with bus snoop operations used to maintain memory coherency in a computing system, comprising:

establishing a bus snoop information storage mode that identifies information pertaining to the bus snoop operations used to maintain memory coherency in the computing system;

facilitating controllable activation of at least the bus snoop information storage mode; and when the bus snoop information storage mode is activated, disregarding the information pertaining to the bus snoop operations occurring in connection with bus snoop stall cycles, and recording a current state of the information pertaining to the bus snoop operations upon completion of the bus snoop operations.

2. The method of claim 1, further comprising determining the completion of the bus snoop operations by monitoring for memory hit and miss indicators for each of agent having an associated memory for which the memory coherency is to be maintained, and recognizing completion of the bus snoop operations when each of the agents have respectively indicated a memory hit or miss.

3. The method of claim 1, further comprising determining the occurrence of bus snoop stall cycles by monitoring for memory hit and miss indicators for each of agent having an associated memory for which the memory coherency is to be maintained, and recognizing the bus snoop stall cycles where any of the agents have not yet indicated a memory hit or miss.

4. The method of claim 3, further comprising repeatedly monitoring for the memory hit and miss indicators for each of the agents until all of the agents have indicated a memory hit or miss, and recognizing completion of the bus snoop operations when each of the agents has indicated a memory hit or miss.

5. The method of claim 1, further comprising designating a plurality of information storage modes, each identifying a different set of information of the computing system to be monitored, wherein at least one of the information storage modes is the bus snoop information storage mode.

6. The method of claim 5, wherein establishing a bus snoop information storage mode comprises designating at least one of the plurality of information storage modes as the bus snoop information storage mode.

7. The method of claim 1, wherein recording a current state of the information comprises storing the current state of the information pertaining to the bus snoop operations when the bus snoop operations have completed without any of the bus snoop stall cycles.

8. The method of claim 1, wherein disregarding the information pertaining to the bus snoop operations occurring in connection with bus snoop stall cycles comprises monitoring both the information pertaining to the bus snoop operations occurring in connection with bus snoop stall cycles and the information pertaining to the bus snoop operations upon completion of the bus snoop operations, and storing only the information pertaining to the bus snoop operations upon completion of the bus snoop operations.

9. The method of claim 1, wherein disregarding the information pertaining to the bus snoop operations occurring in connection with bus snoop stall cycles comprises monitoring only the information pertaining to the bus snoop operations upon completion of the bus snoop operations, and recording the current state of the information.

10. The method of claim 1, wherein facilitating controllable activation of at least the bus snoop information storage mode comprises enabling activation of the bus snoop information storage mode via a dynamic scan register.

11. The method of claim 1, wherein recording a current state of the information comprises storing the current state of the information pertaining to the bus snoop operations as an entry in a multi-entry memory device, and further comprising incrementing the multi-entry memory to the next available entry location upon recording the current state of the information.

12. An apparatus for selectively storing information associated with bus snoop operations used to maintain cache coherency in a computing system having multiple agents each associated with at least one respective cache memory for which the cache coherency is to be maintained, the apparatus comprising:
 a memory;
 a history control register to receive and store data indicative of a bus snoop information storage mode; and
 a history control processing arrangement coupled to the history control register and to the memory, and having an interface to receive the information associated with the bus snoop operations, wherein the history control processing arrangement is configured to activate the bus snoop information storage mode based on the data in the history control register, and in response to prohibit the memory from storing a first subset of the information corresponding to bus snoop operation data occurring in connection with bus snoop stall cycles and to enable the memory to store a second subset of the information corresponding to bus snoop operation data occurring in connection with completed bus snoop operations.

13. The apparatus of claim 12, further comprising a user input device coupled to the history control register to facilitate user entry of the data indicative of the bus snoop information storage mode.

14. The apparatus of claim 12, wherein the history control register comprises a dynamic scan register to serially receive the data indicative of the bus snoop information storage mode.

15. The apparatus of claim 12, further comprising a computing device coupled to the history control register to retrieve the second subset of the information from the memory.

16. The apparatus of claim 12, wherein the memory comprises an enable input to receive signals enabling or prohibiting storing of the information, and wherein the processor is configured to prohibit the memory from storing the first subset of the information by providing a first a signal to the enable input, and to enable the memory to store the second subset of the information by providing a second signal to the enable input.

17. A system for selectively storing information associated with bus snoop operations used to maintain cache coherency in a multi-agent computing system, comprising:
 means for receiving a plurality of indicators each indicative of a respective information storage mode;
 means for activating a bus snoop information storage mode in response to the data receiving means having received a particular one of the indicators;
 means for prohibiting storage of a first set of the information associated with the bus snoop operations that occurs in connection with bus snoop stall cycles affecting any of the agents in the multi-agent computing system, when the bus snoop information storage mode has been activated;
 means for enabling storage of a second set of the information associated with the bus snoop operations that occurs in connection with completion of the bus snoop operations when all of the bus snoop stall cycles have ceased, when the bus snoop information storage mode has been activated; and
 means, coupled to the means for enabling storage, for storing the second set of the information.

* * * * *